S. CROSSLEY.
Stalk-Cutting Attachments for Cultivators.
No. 147,612. Patented Feb. 17, 1874.

UNITED STATES PATENT OFFICE.

SAMUEL CROSSLEY, OF ROCK ISLAND, ILLINOIS.

IMPROVEMENT IN STALK-CUTTING ATTACHMENTS FOR CULTIVATORS.

Specification forming part of Letters Patent No. 147,612, dated February 17, 1874; application filed June 7, 1873.

*To all whom it may concern:*

Figure 1:
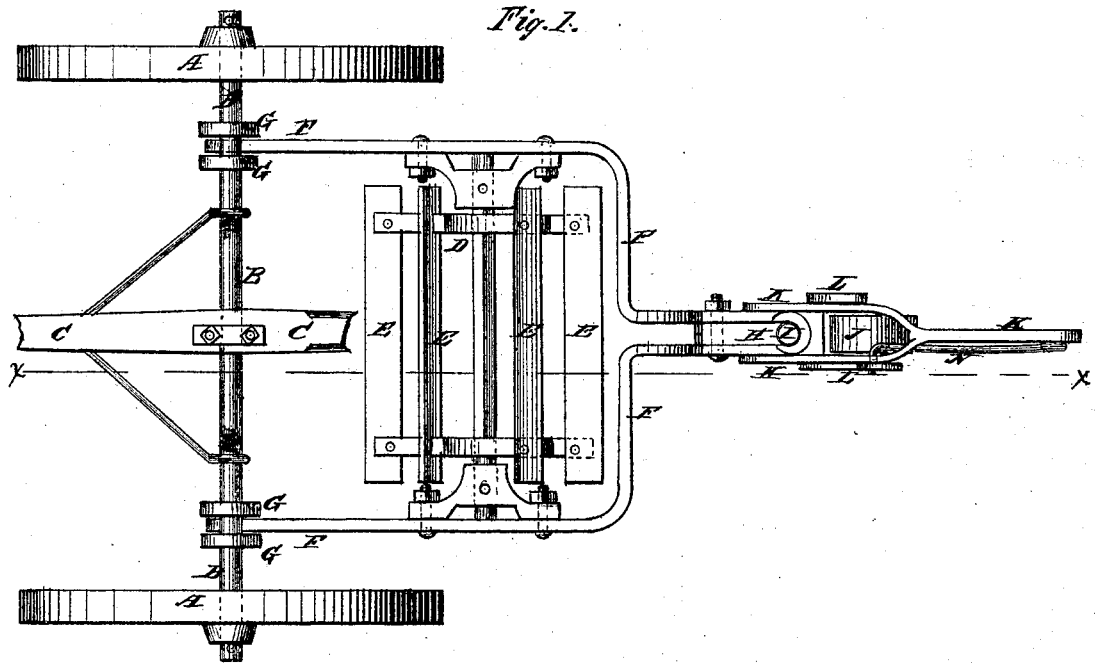
Figure 2:
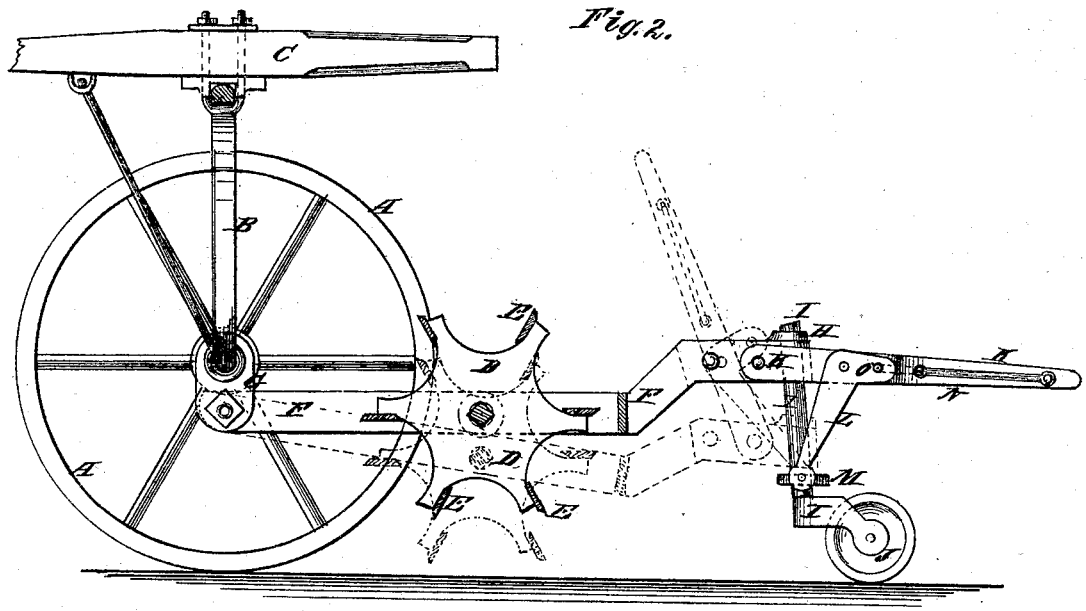

Be it known that I, SAMUEL CROSSLEY, of Rock Island, in the county of Rock Island and State of Illinois, have invented a new and useful Improvement in Stalk-Cutting Attachment for Cultivators, of which the following is a specification:

Figure 1 is a top view of my improved attachment, shown as applied to the axle of a cultivator. Fig. 2 is a vertical longitudinal section of the same taken through the line $x$ $x$, Fig. 1.

Similar letters of reference indicate corresponding parts.

The invention relates to stalk-cutters, especially such as are adapted to be attached to cultivators. It will first be fully described, and then clearly pointed out in the claim.

A represents the wheels, B the bent axle, and C the tongue, of a cultivator, about the construction of which there is nothing new. D are the heads, and E are the blades, knives, or cutters, about the construction of which there is nothing new, and the journals of which revolve in bearings attached to the inner sides of the side bars of the frame F. The forward ends of the side bars of the frame F are connected with the bent axle B by link-connections G, so that the said frame may rise and fall to prevent the cultivator from being jarred by the operation of the stalk-cutter. The frame F may be connected with the frame of the cultivator, and the connection may be made by means of the cultivator-couplings, when they are of suitable construction. The side bars of the frame F, at the rear side of the cutter-heads, are bent inward at right angles, extend inward nearly to the center, are then bent outward at right angles, incline upward, project to the rearward parallel with each other, and to and between their rear ends is secured the sleeve H, in which the stem I of the caster-wheel J works. K is a lever, the forward part of which is forked, and is pivoted to the rear ends of the side bars of the frame F, a little in front of the sleeve H. To the lever K, a little in the rear of the sleeve H, is pivoted the upper ends of the bars or levers L, the lower ends of which are pivoted to the trunnions of the collar M, placed upon the lower part of the stem or spindle I of the caster-wheel J, where it is kept from moving upward, while allowing the stem I to turn freely by a pin attached to said collar, so that the collar M, when raised, may raise the caster-wheel J from the ground, allowing the whole weight of the frame F, levers K, bars L, and caster-wheel I J to bear upon the cutter-head D E.

By this construction, by raising the lever K into the position shown in dotted lines in Fig. 2, it and the bars L lock themselves and hold the caster-wheel suspended. When the lever K is lowered, the caster-wheel is lowered, to bear upon the ground, and the frame F is raised, as shown in full lines in Fig. 2, so that the machine may be turned and drawn from place to place without allowing the cutters to touch the ground.

The lever K is locked in position, when lowered, by a spring-catch, N, attached to said lever, and which takes hold of an arm, O, attached to or formed upon one of the bars or levers L.

Having thus described my invention, I claim as new and desire to secure by Letters Patent—

The combination of the lever K, bars L, and trunnioned collar M with the caster-wheel J, stem or spindle I, and frame F, that carries the cutter-head D E, substantially as herein shown and described.

SAMUEL CROSSLEY.

Witnesses:
H. H. WIBIRT,
H. A. STARKWEATHER.